US012611067B2

(12) United States Patent
Stover

(10) Patent No.: US 12,611,067 B2
(45) Date of Patent: Apr. 28, 2026

(54) RETRACTABLE CURVED SHOWER DOOR

(71) Applicant: Stoett Industries, Hicksville, OH (US)

(72) Inventor: Chris Stover, Hicksville, OH (US)

(73) Assignee: STOETT INDUSTRIES, Hicksville, OH (US)

( * ) Notice: Subject to any disclaimer, the term of this patent is extended or adjusted under 35 U.S.C. 154(b) by 969 days.

(21) Appl. No.: 17/806,951

(22) Filed: Jun. 15, 2022

(65) Prior Publication Data

US 2022/0400907 A1 Dec. 22, 2022

Related U.S. Application Data

(60) Provisional application No. 63/211,629, filed on Jun. 17, 2021.

(51) Int. Cl.

*A47K 3/34* (2006.01)
*E05C 19/16* (2006.01)
*E05D 15/06* (2006.01)
*E06B 3/80* (2006.01)

(52) U.S. Cl.

CPC ................ *A47K 3/34* (2013.01); *E05C 19/16* (2013.01); *E05D 15/0652* (2013.01); *E05D 15/0656* (2013.01); *E06B 3/80* (2013.01); *E05Y 2201/484* (2013.01); *E05Y 2201/668* (2013.01); *E05Y 2201/684* (2013.01); *E05Y 2800/266* (2013.01); *E05Y 2800/676* (2013.01); *E05Y 2900/114* (2013.01)

(58) Field of Classification Search

CPC ....... A47K 3/34; E05C 19/16; E05D 15/0652; E05D 15/0656; E06B 3/80

USPC .............................................................. 4/608

See application file for complete search history.

(56) References Cited

U.S. PATENT DOCUMENTS 4,359,081 A * 11/1982 Brower ..................... E06B 9/54 160/243
4,825,921 A * 5/1989 Rigter ....................... E06B 9/54 160/271

(Continued)

FOREIGN PATENT DOCUMENTS

CN 203059511 U 7/2013
DE 102019103436 A1 8/2020

(Continued)

*Primary Examiner* — David P Angwin
*Assistant Examiner* — William R Klotz
(74) *Attorney, Agent, or Firm* — Michael E. Dockins; Shumaker, Loop & Kendrick, LLP

(57) ABSTRACT

A retractable curved door assembly includes a spring-loaded roller assembly having a reel structure configured to rotate about an axis of rotation thereof, a rail extending away from the spring-loaded roller assembly in a direction perpendicular to the axis of rotation of the reel structure with at least a portion of the rail curving about an axis arranged parallel to the axis of rotation of the reel structure, a door end structure slidably engaging the rail, a flexible screen coupled to the reel structure and to the door end structure, and a tension element coupled to the reel structure and the door end structure. A greater tensile force is applied to the tension element than to the flexible screen when the door end structure is slid along the rail in a direction away from the spring-loaded roller assembly to prevent buckling of the flexible screen.

19 Claims, 8 Drawing Sheets

(56) References Cited

U.S. PATENT DOCUMENTS

| | | | | |
|---|---|---|---|---|
| 6,435,254 | B1 * | 8/2002 | Todd | A47K 3/38 160/313 |
| 6,470,511 | B1 | 10/2002 | Smale | |
| 7,487,816 | B2 * | 2/2009 | Moriya | E06B 9/54 160/31 |
| 8,191,604 | B2 * | 6/2012 | Wang | E06B 9/0692 160/293.1 |
| 11,105,148 | B2 * | 8/2021 | Shipman | E06B 9/42 |
| 2001/0042346 | A1 * | 11/2001 | Brioschi | E06B 9/54 49/447 |
| 2005/0098276 | A1 * | 5/2005 | Agliolo Quartalaro | E06B 9/54 160/276 |
| 2007/0199667 | A1 * | 8/2007 | Jumbeck | E06B 9/54 160/274 |
| 2016/0265275 | A1 | 9/2016 | Rosell Rosell | |
| 2020/0268215 | A1 * | 8/2020 | Ordaz | A47K 3/34 |

FOREIGN PATENT DOCUMENTS

| | | | |
|---|---|---|---|
| WO | 1997049322 | A1 | 12/1997 |
| WO | 2020099894 | A1 | 5/2020 |

* cited by examiner

RETRACTABLE CURVED SHOWER DOOR

CROSS-REFERENCE TO RELATED APPLICATION

This patent application claims priority to U.S. Provisional Patent Application Ser. No. 63/211,629, filed on Jun. 17, 2021, the entire disclosure of which is hereby incorporated herein by reference.

FIELD

The present technology relates to a shower door assembly for use with a shower having a curved frame defining a curved opening, including showers having discrete space limitations such as those found in recreational vehicles.

BACKGROUND OF THE INVENTION

This section provides background information related to the present disclosure which is not necessarily prior art.

Various types of doors are used in water containment applications. In the context of doors for use in conjunction with bathtubs and showers, certain types of doors exhibit limitations. Rigid panel glass and/or plastic doors are used as tub and shower doors; however, such doors are typically opened by a sliding mechanism or by being hinged either as a single hinged panel door or as a bi-fold door. These types of rigid panel doors, when operating with a sliding mechanism, limit access space and do not allow a full entryway to the tub or shower, whereas hinged doors require space for the doors to swing to gain access to the tub or shower, which can conflict with certain architectures and tub or shower layouts. Moreover, when not open, such sliding or hinged doors have the further disadvantage of taking up a considerable amount of space. Access space and operation space for tub and shower doors can accordingly limit residential floor plans and can be a significant concern in optimizing space for areas having limited or predetermined dimensions, including mobile homes and recreational vehicles.

Other door-like closures for water containment applications include those in the form of flexible slidable shower curtains hung from a bar above a tub/shower opening. While inexpensive, such curtains are frequently ineffective to prevent water leakage and considerable water damage can result, and especially through careless use. Attempts have also been made to use plastic sheets which can be pulled out to cover the shower opening, and then rewound or refolded to conserve space when not in use. Such attempts have also not been successful from the standpoints of utility, cost, and aesthetics.

Certain examples of curved retractable shower screens include those described in U.S. Pat. No. 6,470,511 to Smale (hereinafter '511), which can be used in conjunction with a tub or shower installed at a corner or at an intersection of two walls. In particular, FIGS. 1-5 of '511 detail a shower screen having at least one curve outwardly from the shower enclosure to effectively increase the space for showering. In providing the curved shower screen, curved top and/or bottom rails provide retaining means for retaining upper and/or lower edges of the shower screen to the top and/or bottom rails when the shower screen is extended to enclose the tub or shower. As shown in FIGS. 1-2 of '511, the retaining means comprises a plurality of knobs attached to, or integral with, the rails. Corresponding holes are provided in upper and lower edges of the shower screen. In this way, the upper and lower edges of the shower screen run outside the rails and as the rolled-up shower screen in the housing is pulled across the open face of the shower enclosure, the knobs insert into holes and thereby retain the shower screen to the rails. The retaining means is necessary in this design, as the retaining means prevents the shower screen from encroaching on the showering area inside the rails due to the tension of the spring in the retractable shower screen that urges the shower screen to take a straight path between the spring loaded roller and the engagement means when the shower screen is extended to enclose the shower. The '511 patent also describes where the retaining means for retaining the shower screen top/bottom rails comprises a seam at the top edge and/or bottom edge of the shower screen that rides inside grooves in the top rail and/or bottom rail, respectively. In yet a further embodiment, the shower screen runs outside the top rail and/or the bottom rail and friction between the top/bottom rails and shower screen prevents the shower screen from encroaching on the showering area.

Certain limitations are inherent in the retaining means described by the '511 patent in maintaining a curved configuration of the shower screen. First, where the retaining means includes knobs in the curved rails and corresponding holes in the edges of the shower screen, these features must be aligned and engaged with each other in order to retain the curve in the shower screen and secure the screen from returning to a straight configuration based upon the tension of the spring-loaded roller. Second, where the retaining means includes a seam in the rails for the screen to ride within, or where the screen rides outside of the rails, friction necessary to retain the screen in a curved configuration can make extension and retraction of the shower screen awkward, where screen movement is not smooth, exhibits changes in the amount of force necessary throughout the curve, and where the friction between the screen and the rails is different when the screen is wet or dry.

Accordingly, there is a need for a space-optimizing tub or shower screen that maintains a curved profile throughout a range of operation, that exhibits smooth and consistent extension and retraction regardless of curve position or wetness, and that does not require cumbersome engagement of discrete retaining features, such as where particular knobs must be fit within particular holes or the like.

SUMMARY

The present technology includes articles of manufacture, systems, and processes that relate to retractable curved door assemblies that can be used to enclose tubs or showers and prevent water from exiting the tub or shower during bathing activities.

According to an embodiment of the present invention, a retractable curved door assembly includes a spring-loaded roller assembly having a reel structure configured to rotate about an axis of rotation thereof, a rail extending away from the reel structure in a direction perpendicular to the axis of rotation of the reel structure with at least a portion of the rail curving about an axis arranged parallel to the axis of rotation of the reel structure, a door end structure slidably engaging the rail, a flexible screen coupled to the reel structure and to the door end structure, and a tension element coupled to the reel structure and the door end structure. A greater tensile force is applied to the tension element than to the flexible screen when the door end structure is slid along the rail in the direction away from the reel structure.

According to another embodiment of the present invention, a retractable curved door assembly includes a spring-loaded roller assembly having a reel structure configured to rotate about an axis of rotation thereof. A first rail and a second rail each extend away from the reel structure in a direction perpendicular to the axis of rotation of the reel structure with at least a portion of each of the first rail and the second rail curving about an axis arranged parallel to the axis of rotation of the reel structure. A door end structure is slidably or rollably engaging each of the first rail and the second rail. A flexible screen is coupled to the reel structure and to the door end structure. The flexible screen extends vertically between the first rail and the second rail. A first tension element is coupled to the reel structure and the door end structure. A second tension element is coupled to the reel structure and the door end structure. A greater tensile force is applied collectively to the first tension element and the second tension element than is applied to the flexible screen when the door end structure is slid along the first rail and the second rail in the direction away from the reel structure.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
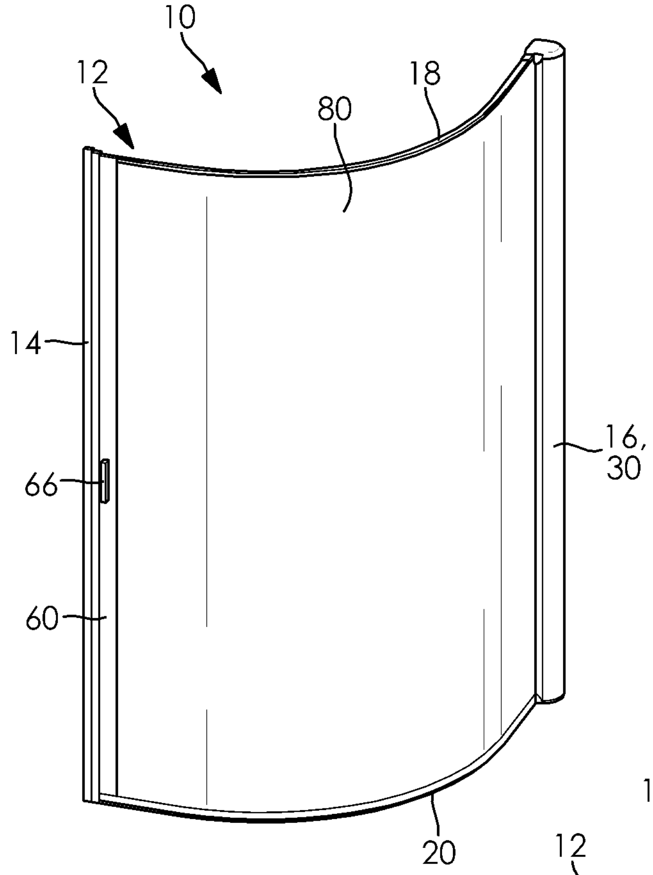
FIG. 1 is a front perspective view of a retractable curved door assembly according to an embodiment of the present invention.
Figure 2:
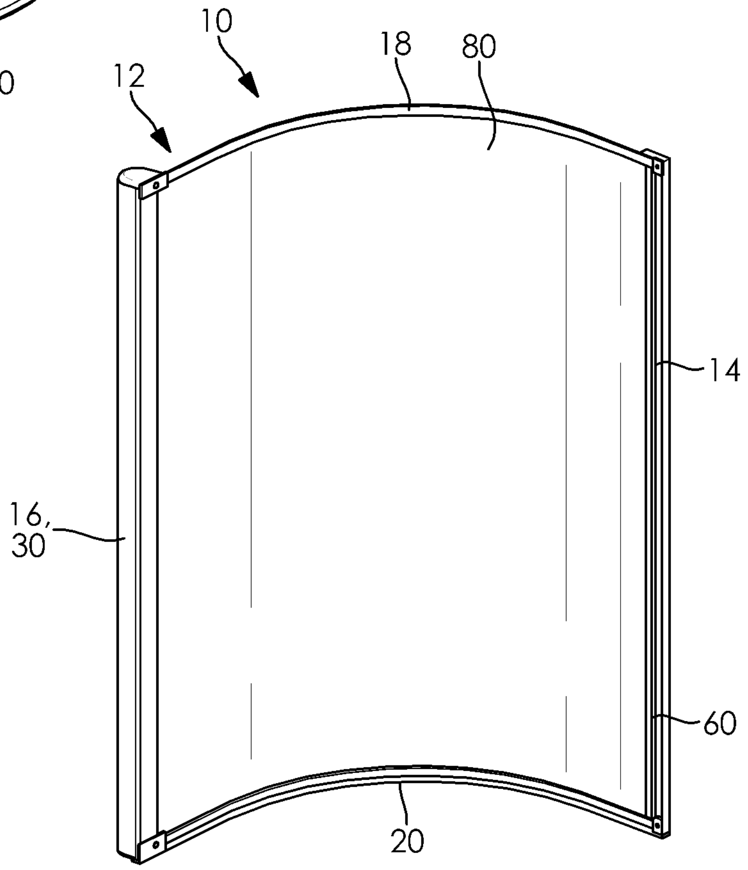
FIG. 2 is a rear perspective view of the retractable curved door assembly.
Figure 3:
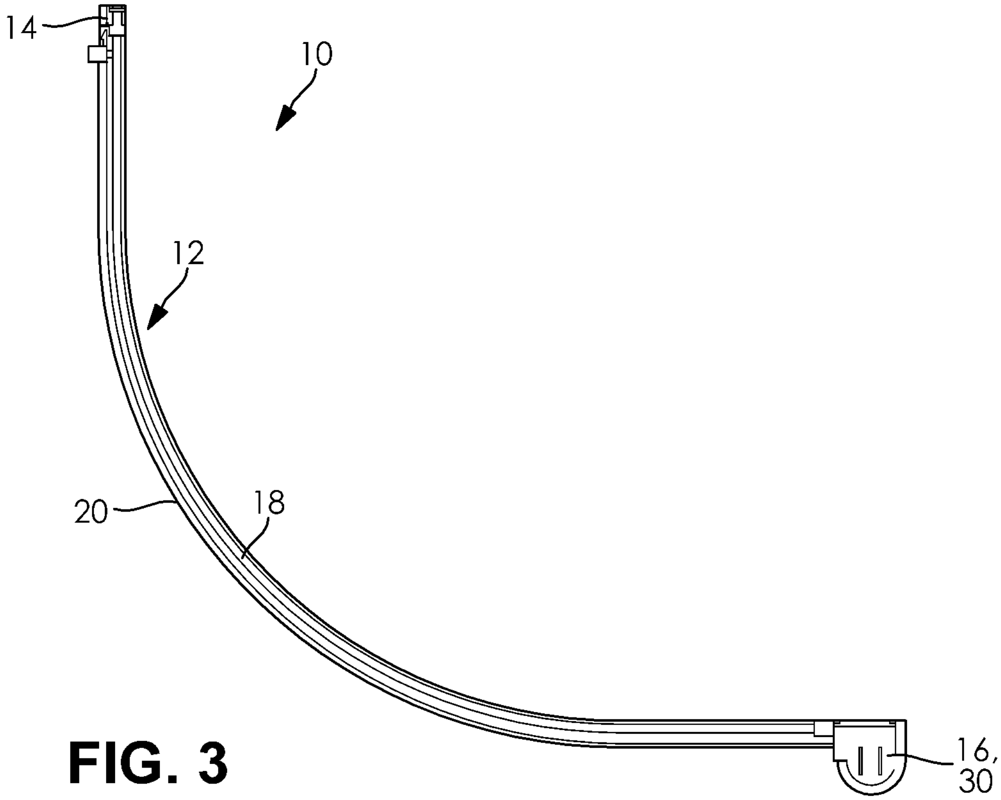
FIG. 3 is a top plan view of the retractable curved door assembly.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of" Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, all compositional percentages are by weight of the total composition, unless otherwise specified. Disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9,1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIGS. 1-11 illustrate a retractable curved door assembly 10 according to an embodiment of the present invention, which is referred to hereinafter as the door assembly 10 for brevity. The door assembly 10 as shown and described herein may be suitable for use as a portion or component of a shower enclosure, such as a shower enclosure as is typically found in a recreational vehicle. However, it should be apparent that the door assembly 10 shown and described herein may be used for other applications, including any circumstance where it is desirable to obstruct or otherwise close off or obscure a curved boundary between an interior and an exterior of a corresponding enclosure. The door assembly 10 generally includes a frame 12, a housing 30, a spring-loaded roller assembly 40, a door end structure 60, a flexible screen 80, and at least one tension element 90.

The frame 12 includes a first vertical member 14, a second vertical member 16, a top rail 18, and a bottom rail 20. Inner facing surfaces of the vertical members 14, 16 and the rails 18, 20 cooperate to define a boundary between an interior and an exterior of an enclosure as formed by the door assembly 10. The first vertical member 14 extends between and connects a first end of the top rail 18 to a first end of the bottom rail 20 and the second vertical member 16 extends between and connects a second end of the top rail 18 to a second end of the bottom rail 20. The vertical members 14, 16 may alternatively be referred to as the doorjambs of the frame 12, as desired. The top rail 18 and the bottom rail 20 each include the same shape as each of the rails 18, 20 extends horizontally from the first vertical member 14 to the second vertical member 16.

Each of the rails 18, 20 includes at least one curved segment as the rails 18, 20 extend between the first vertical member 14 and the second vertical member 16, wherein the at least one curved segment includes curvature extending around a vertically arranged axis. In the illustrated embodiment, each of the rails 18, 20 includes a first rectilinear segment extending inwardly from the first vertical member 14, a second rectilinear segment extending inwardly from the second vertical member 16, and a curved segment disposed intermediate and connecting the outwardly disposed first and second rectilinear segments. The curved segment is shown as having a constant radius of curvature through a 90 degree arc of angular displacement, thereby causing the curved segment to have a shape of a quadrant of a circle. However, it should be apparent to one skilled in the art that the present invention may be applicable to a variety of different configurations having at least one curved segment, including the use of any combination of rectilinear and curved segments, as desired. The illustrated 90 degree curve is also not considered limiting, as the present invention may be applied to curved segments of boundaries extending angularly through substantially any angle between 0 and 360 degrees, as desired. For example, the present invention may be applied to a semi-circular shaped shower enclosure having a 180 degree curved boundary.

The first vertical member 14 is shown as an extrusion having a shape suitable for joining with the rails 18, 20 while also forming a first coupling mechanism 22 of the door assembly 10. The first coupling mechanism 22 is configured to couple the first vertical member 14 to a second coupling mechanism 62 of the door end structure 60. In the provided example, the first coupling mechanism 22 and the second coupling mechanism 62 include complimentary shapes for forming a snap-fit type connection when the second coupling mechanism 62 is moved horizontally towards the first coupling mechanism 22 during a closing of the door assembly 10. However, any type of releasable coupling may be facilitated between the first and second coupling mechanisms 22, 62 while remaining within the scope of the present invention, including the use of magnetic coupling features, interlocking features, latches, or the like, so long as the door assembly 10 can be selectively maintained in a closed position against the urging of the spring-loaded roller assembly 40 when the door end structure 60 is removably coupled to the first vertical member 14.

In the illustrated embodiment, the housing 30 having the spring-loaded roller assembly 40 disposed therein forms the second vertical member 16 of the frame 12. However, it should be apparent that the housing 30 may instead be independently provided and coupled to another vertically arranged structure while remaining within the scope of the present invention. The housing 30 is shown as including a first end cap 31 disposed over a first open end 33 thereof and a second end cap 32 disposed over a second open end 34 thereof. The end caps 31, 32 provide selective access to a hollow interior 35 of the housing 30 at each of the open ends 31, 32. The hollow interior 35 may be substantially cylindrical in shape to accommodate the substantially cylindrical shape of the spring-loaded roller assembly 40. Each of the end caps 31, 32 may further include structure for forming a rotary connection between the housing 30 and the spring-loaded roller assembly 40. The housing 30 may alternatively be formed devoid of the end caps 31, 32, so long as the remaining relationships described herein regarding a method of operation of the housing 30 and the corresponding spring-loaded roller assembly 40 are maintained.

The housing 30 includes a first tension element opening 37 formed adjacent the first open end 33 thereof, a second tension element opening 38 formed adjacent the second open end 34 thereof, and a flexible screen opening 39 extending in a height direction of the housing 30 intermediate the first tension element opening 37 and the second tension element opening 38. The first tension element opening 37 forms a first passageway for a first tension element 91 of the at least one tension elements 90 to pass through when extending from the hollow interior 35 of the housing 30 to an exterior thereof. Similarly, the second tension element opening 38 forms a second passageway for a second tension element 92 of the at least one tension elements 90 to pass through when extending from the hollow interior 35 of the housing 30 to the exterior thereof. Lastly, the flexible screen opening 39 forms a passageway for the flexible screen 80 to pass through when extending from the hollow interior 35 of the housing 30 to the exterior thereof.

The door end structure 60 is shown as including an inner element 63 disposed towards an interior of the enclosure formed by the frame 12 and an outer element 64 disposed towards an exterior of the enclosure. The inner element 63 is shown as an extrusion having a handle 65 formed therein for grasping the door end structure 60 from the interior of the enclosure. The outer element 64 is shown as an extrusion having a plate-like configuration with a handle 66 coupled to an outwardly exposed surface thereof for grasping the door end structure 60 from the exterior of the enclosure.

Figure 4:
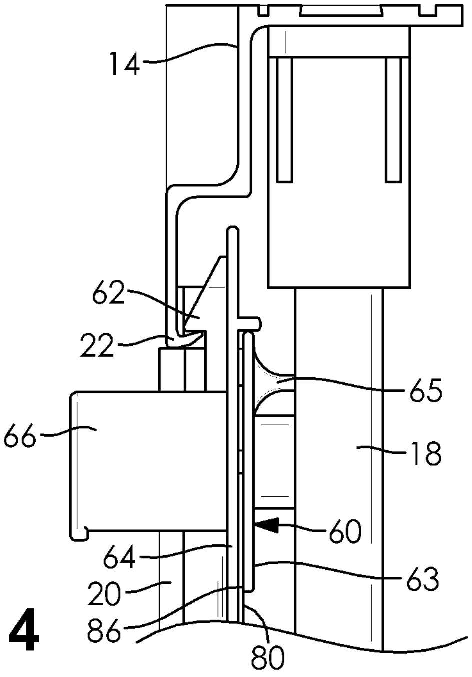
FIG. 4 is an enlarged fragmentary view of the portion of FIG. 3.
Figure 5:
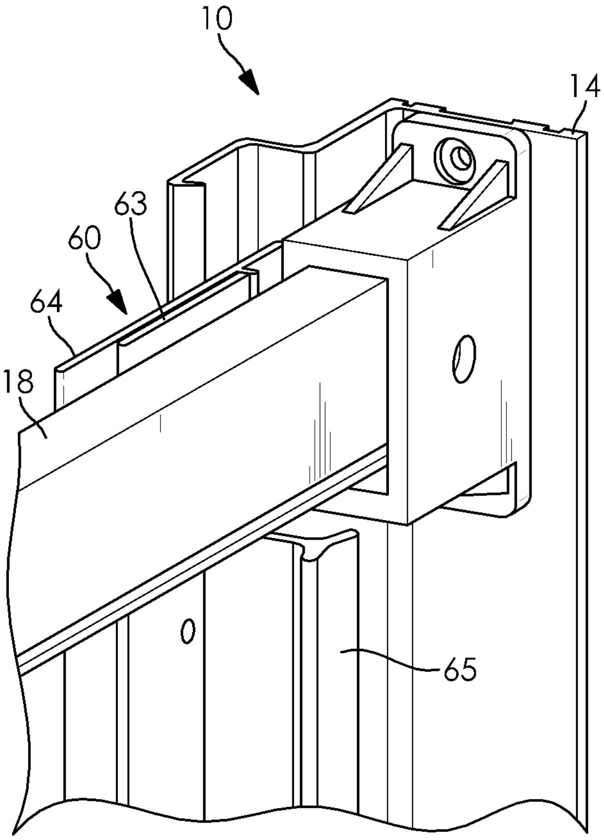
FIG. 5 is a fragmentary rear perspective view of a portion of a frame of the retractable curved door assembly.
Figure 6:
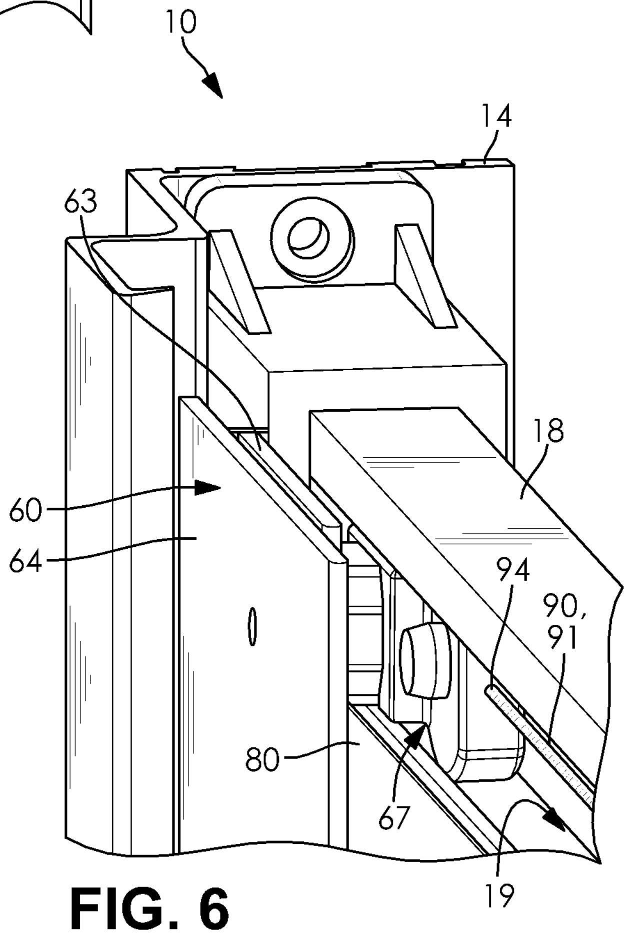
FIG. 6 is a fragmentary front perspective view of the portion of the frame.
Figure 7:
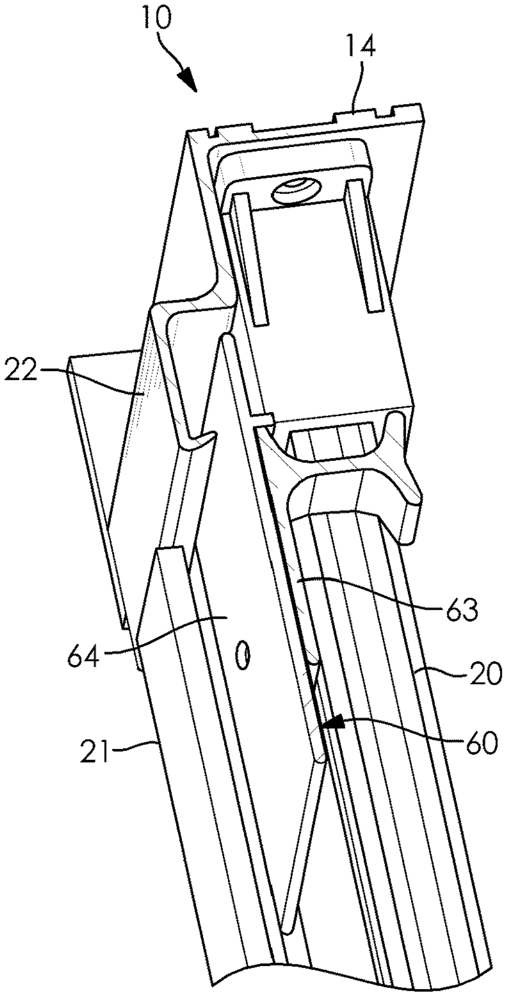
FIG. 7 is a fragmentary cross-sectional view taken through a portion of the frame of the retractable curved door assembly.
Figure 8:
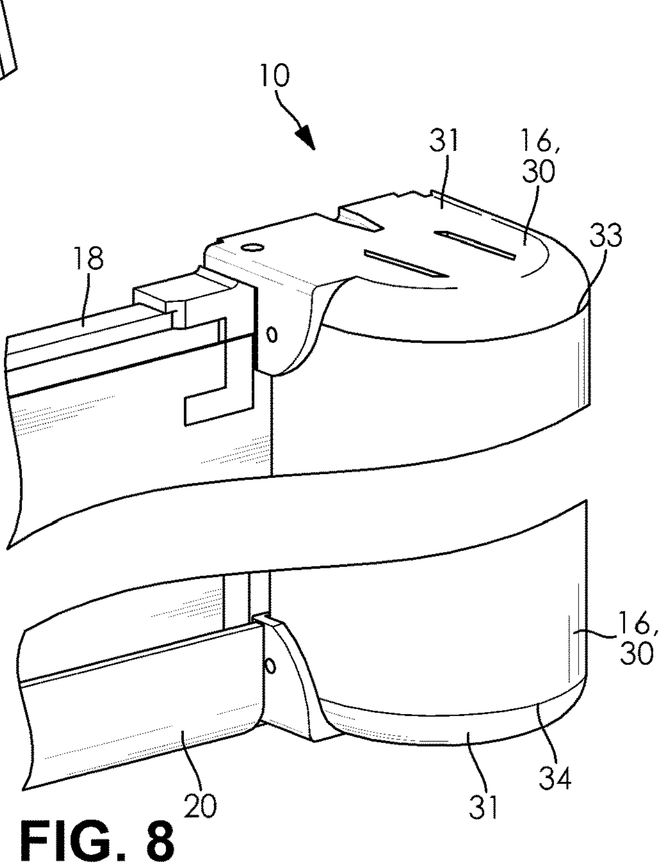
FIG. 8 is fragmentary perspective view of a top end and a bottom end of a housing of the retractable curved door assembly.
Figure 9:
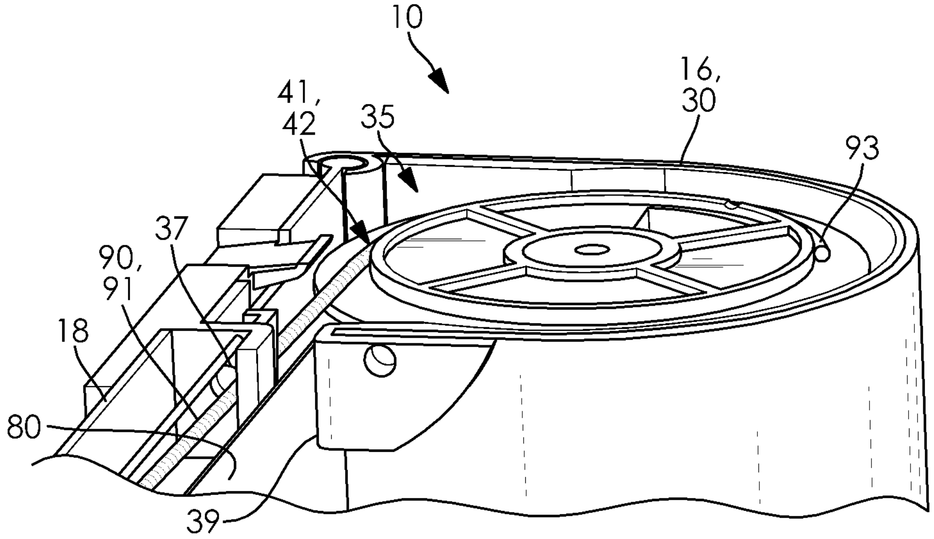
FIG. 9 is a fragmentary cross-sectional view taken through a portion of the housing disposed adjacent a top rail of the frame.
Figure 10:
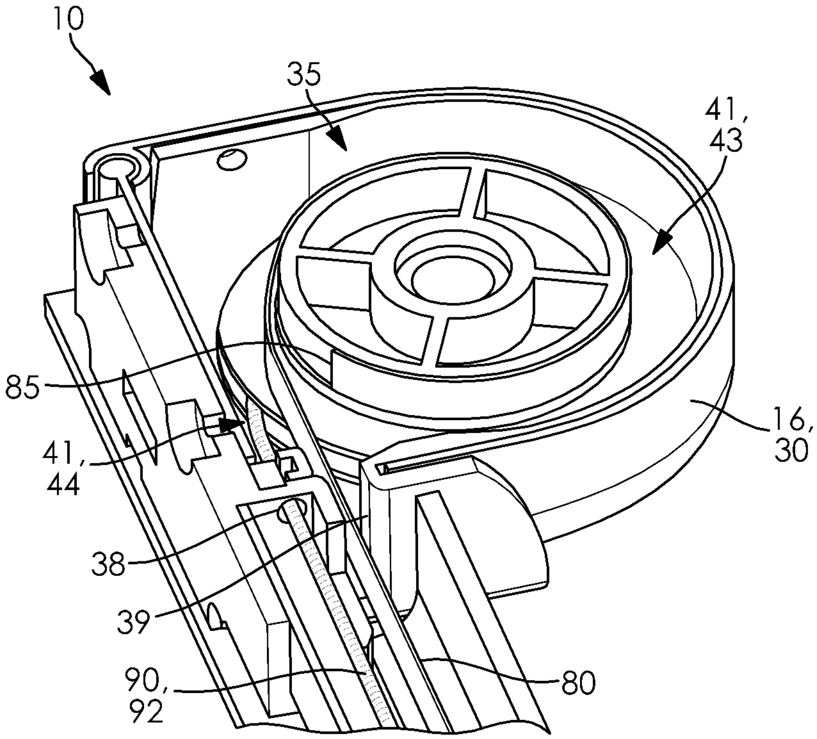
FIG. 10 is a fragmentary cross-sectional view taken through a portion of the housing disposed adjacent a bottom rail of the frame.

As shown in FIGS. 4 and 6, a sliding mechanism 67 extends laterally inwardly from the inner element 63 for reception into a channel 19 formed in a side surface of the top rail 18. The sliding mechanism 67 is slidably or rollably received within the channel 19 to allow for the sliding mechanism 67, and the remainder of the door end structure 60 coupled thereto, to slide or roll along and traverse the path formed by the rails 18, 20 between the opposing vertical members 14, 16. The channel 19 is C-shaped to prevent lateral removal of the sliding mechanism 67 therefrom. The sliding mechanism 67 also extends within the channel 19 in the longitudinal direction of the top rail 18 in a manner preventing rotation of the door end structure 60 relative to the frame 12. As shown in FIG. 7, the inner member 63 and the outer member 64 may be disposed between the bottom rail 20 and a retaining lip 21 disposed laterally outwardly of the bottom rail 20, wherein the retaining lip 21 is configured to prevent any water flowing downwardly along the flexible screen 80 from exiting the enclosure formed by the door assembly 10. The members 63, 64 may be slidably positioned between the rail 20 and the lip 21 to further prevent rotation of the door end structure 60 relative to the frame 12. The above-described features accordingly aid in maintaining the vertical arrangement of the door end structure 60 throughout a range of positions of the door end structure 60 between the opposing vertical members 14, 16.

The spring-loaded roller assembly 40 is shown as having a reel structure 41 and a torsion spring assembly 50. The reel structure 41 is configured to rotate about a vertically extending axis of rotation to facilitate a rolling or an unrolling of the flexible screen 80 or each of the at least one tension elements 90 thereabout or therefrom. The reel structure 41 may be rotatably coupled to the housing 30 adjacent each of the ends 33, 34 thereof.

Figure 11:
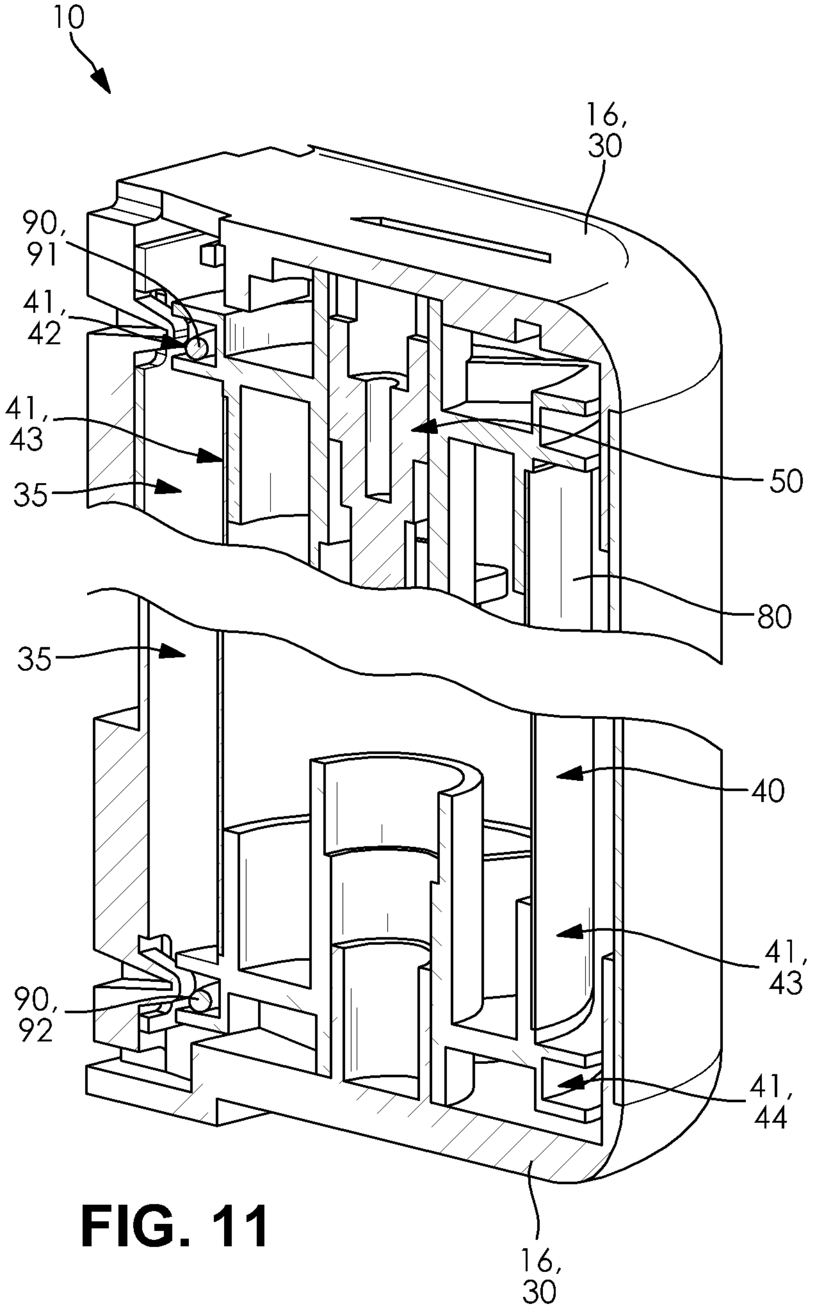
FIG. 11 is fragmentary cross-sectional view showing an interior of the housing of the retractable curved door assembly with respect to each of the top end and the bottom end thereof.

As best shown in FIG. 11, the reel structure 41 is shown as being divided axially into a first tension element receiving portion 42, a flexible screen receiving portion 43, and a second tension element receiving portion 44. The first tension element receiving portion 42 is disposed adjacent the first open end 33 of the housing 30, the second tension element receiving portion 44 is disposed adjacent the second opening end 34 of the housing 30, and the flexible screen receiving portion 43 is disposed intermediate the first and second tension element receiving portions 42, 44. The first tension element receiving portion 42 is configured to rollably receive the first tension element 91 thereover, the second tension element receiving portion 44 is configured to rollably receive the second tension element 92 thereof, and the flexible screen receiving portion 43 is configured to rollably receive the flexible screen 80 thereover.

The torsion spring assembly 50 is coupled to each of the stationary housing 30 and the rotatable reel structure 41. The torsion spring assembly 50 is configured to apply an increasing torsional force to the reel structure 41 as the reel structure 41 is rotated in a direction corresponding to an unrolling of each of the tension elements 91, 92 and the flexible screen 80 from the reel structure 41, which also corresponds to the door end structure 60 being moved away from the spring-loaded roller assembly 40 along the rails 18, 20 in a direction perpendicular to the axis of rotation of the reel structure 41. The torsion spring assembly 50 is accordingly configured to urge the reel structure 41 to retract the flexible screen 80 and the tension elements 91, 92 back to the rolled configurations thereof as they are unrolled from the reel structure 41. The spring force applied by the torsion spring assembly 50 may be configured to progressively increase as the door end structure 60 is progressively moved away from the reel structure 41 and the reel structure 41 continues to unroll a greater length of the flexible screen 80 and the tension elements 90.

The flexible screen 80 may be formed from a sheet of any material having the necessary flexibility for the flexible screen 80 to curve around a vertically extending axis when unrolled and extended away from the spring-loaded roller assembly 40. The flexible screen can also be formed from a material having enough strength and rigidity to be self-supporting. That is, the flexible screen 80 is formed from a material that can stand under its own weight without collapsing or buckling and without the need to be hung or suspended. The flexible screen 80 may be formed from a polymeric material, such as a plastic material. In some embodiments, the flexible screen 80 may be formed from a sheet of polyethylene terephthalate (PET), as one non-limiting example.

The flexible screen 80 can be configured to include a height sufficient to substantially span a distance between the top rail 18 and the bottom rai 20. In this manner, a height of the flexible screen 80 between the top and bottom rails can be tailored and optimized to prevent water from exiting the shower enclosure formed by the door assembly 10 when the flexible screen 80 is in the extended position and the shower is in use. The flexible screen 80 also includes a length in a direction perpendicular to the height direction (which corresponds to an unrolling direction of the flexible screen 80) that allows for the flexible screen 80 and the door end structure 60 to combine to span the distance of the pathway formed by the rails 18, 20 between the vertical members 14, 16, thereby preventing water from exiting the shower enclosure formed by the door assembly 10 when the flexible screen 80 is in the extended position and the shower is in use.

The flexible screen 80 is fixedly coupled to an outer surface of the flexible screen receiving portion 43 of the reel structure 41 at a first coupling point 85 disposed at or adjacent the first end of the flexible screen 80. The flexible screen 80 is also fixedly coupled to the door end structure 60 at a second coupling point 86 disposed at or adjacent the second end of the flexible screen 80. Referring back to FIG. 4, the flexible screen 80 may be sandwiched between the inner and outer elements 63, 64 of the door end structure 60 to secure a position of the second end of the flexible screen 80 relative to the door end structure 60, wherein the second coupling point 86 is formed where the flexible screen 80 is first sandwiched between the inner and outer elements 63, 64. However, alternative coupling methods may be utilized while remaining within the scope of the present invention, so long as the flexible screen 80 is affixed to the door end structure 60 at the second coupling point 86.

Each of the at least one tension elements 90 is provided as an elongate structure having a length that is significantly greater than a maximum diameter thereof, thereby causing each of the tension elements 90 to resemble a cable or cord in structure. Each of the tension elements 90 may include any cross-sectional shape, including but not limited to a circular cross-sectional shape. Each of the tension elements 90 is configured to be flexible in a manner wherein each of the tension elements 90 can curve away from a central longitudinal axis thereof, thereby allowing for curved segments to be introduced into each of the tension elements 90 as the tension elements 90 are extended away from the reel structure 41, wherein such curved segments may curve about a vertically arranged axis.

The tension elements 90 may be formed from a material having a suitable tensile strength for withstanding the tensile forces applied thereto when the tension elements 90 are unrolled from the reel structure 41. The material may also be selected to stretch minimally in the longitudinal direction of the corresponding tension element 90 to maintain the desired tension on each of the tension elements 90 through a range of motion of the door end structure 60. The material may be a metallic material, and the metallic material may be provided as a weave or braid of individual strands or threads of the metallic material. However, the tension elements 90 may be formed from any material or configuration so long as the tension elements 90 are flexible in the manner described and capable of being placed under tension in accordance with the expected conditions when operating the door assembly 10.

In the illustrated embodiment, the first tension element 91 of the at least one tension elements 90 is coupled to an outer surface of the first tension element receiving portion 42 of the reel structure 41 at a first coupling point 93 disposed at or adjacent a first end of the first tension element 91. The first tension element 91 is also coupled to the door end structure 60 at a second coupling point 94 disposed at or adjacent the second end of the first tension element 91. Referring back to FIG. 6, the first tension element 91 may be clamped within an opening formed in the sliding mechanism 67 of the door end structure 60 to secure a position of the second end of the first tension element 91 relative to the door end structure 60, wherein the second coupling point 94 is formed where the first tension element 91 is first clamped within the sliding mechanism 67. However, alternative coupling methods may be utilized while remaining within the scope of the present invention, so long as the first tension element 91 is affixed to the door end structure 60 at the second coupling point 94.

In the illustrated embodiment, the second tension element 92 of the at least one tension elements 90 is fixedly coupled to an outer surface of the second tension element receiving portion 44 of the reel structure 41 at a first coupling point (not shown) disposed at or adjacent a first end of the second tension element 92. The second tension element 92 is also fixedly coupled to the door end structure 60 at a second coupling point (not shown) disposed at or adjacent the second end of the second tension element 92. The second tension element 92 may be sandwiched between the inner and outer elements 63, 64 forming the door end structure 60 in similar fashion to the flexible screen 80, wherein a position where the second tension element 92 is first sandwiched forms the second coupling point. However, alternative coupling methods may be utilized while remaining within the scope of the present invention, so long as the second tension element 92 is affixed to the door end structure 60 at the second coupling point.

The door assembly 10 is configured to be adjustable between an extended or closed configuration wherein the flexible screen 80 is substantially unrolled and extends between the vertical members 14, 16 and a retracted or open configuration wherein the flexible screen 80 is rolled onto the reel structure 41 and does not extend between the vertical members 14, 16. The extended or closed configuration includes the first coupling mechanism 22 of the first vertical member 14 removably coupled to the second coupling mechanism 62 of the door end structure 60, which corresponds to the door end structure 60 being maximally spaced from the spring-loaded roller assembly 40. In contrast, the retracted or open configuration includes the door end structure 60 being minimally spaced from the spring-loaded roller assembly 40. The torsion spring 50 applies an increasing torsional force to the reel structure 41 as the door end structure 60 is moved away from the spring-loaded roller assembly 40, thereby facilitating a return of the door assembly 10 to the open or retracted configuration.

It has been surprisingly discovered that applying tension to one or both of the tension elements 91, 92 in place of the flexible screen 80 prevents an occurrence of buckling or similar deformations to the flexible screen 80 when the door assembly 10 is adjusted from the retracted or open configuration thereof towards the extended or closed configuration thereof That is, the door assembly 10 is configured wherein each of the tension elements 91, 92 is subjected to a tensile force between the corresponding coupling points thereof as a result of the movement of the door end structure 60 away from the reel structure 41 of the spring-loaded roller assembly 40. The torsion spring assembly 50 applies the tension to each of the tension elements 91, 92 as the tension elements 91, 92 are unrolled from the spring-loaded roller assembly 40. In contrast, the flexible screen 80 is provided to always include a slight degree of slack as the flexible screen 80 is unrolled from the spring-loaded roller assembly 40, hence the flexible screen 80 is not subjected to a tensile force between the corresponding couplings points 85, 86 thereof during an unrolling of the flexible screen 80.

The application of tension to only the at least one tension element 90 may be accomplished by any number of relationships established between the components forming the door assembly 10 while remaining within the scope of the present invention. For example, with reference only to the flexible screen 80 and the first tension element 91, if the first coupling points 85, 93 substantially coincide with each other and the second coupling points 86, 94 substantially coincide with each other, a length of the first tension element 91 intermediate the coupling points 93, 94 thereof is selected to be less than a length of the flexible screen 80 intermediate the coupling points 85, 86 thereof, thereby ensuring that some slack will exist within the flexible screen 80 once the first tension element 91 is subjected to tension as it is pulled between the coupling points 93, 94 thereof. When using this configuration, a tensile elongation of the first tension element 91 must be accommodated to ensure that the elongation does not cause tension to be applied to the flexible screen 80, such as when the first tension element 91 is stretched to the length of the flexible screen 80. A length of the first tension element 91 intermediate the coupling points 93, 94 thereof may accordingly be selected to accommodate such tensile stretching.

As another example, a length present between the coupling points 85, 86 of the flexible screen 80 and a length present between the coupling points 93, 94 of the first tension element 91 may be selected to be the same. The tension may be introduced into the first tension element 91 rather than the flexible screen 80 by repositioning at least one of the coupling points 85, 86, 93, 94 such that the coupling points 85, 93 do not substantially coincide, the coupling points 86, 94 do not substantially coincide, or combinations thereof. For example, if the coupling points 85, 93 substantially coincide, the coupling points 86, 94 may be provided at different locations on the door end structure 60 that are spaced different distances from the spring-loaded roller assembly 40. Alternatively, if the coupling points 86, 94 substantially coincide, the coupling points 85, 93 may be provided at different circumferential positions around the reel structure 41, or dimensions of the different portions 42, 43, 44 thereof may be adjusted.

The application of the tension to only the tension elements 91, 92 allows for the flexible screen 80 to unroll from the reel structure 41 while taking the form of the curvature of each of the rails 18, 20, despite the lack of tension applied thereto. The self-supporting nature of the flexible screen 80 allows the flexible screen 80 to maintain the curved configuration thereof, regardless of the presence of a surface against which the flexible screen 80 can bear while taking the curved shape. The flexible screen 80 also does not require any form of coupling to the rails 18, 20 to maintain the desired configuration thereof, such as the insertion of projections into corresponding apertures for hanging the flexible screen 80.

In use, an operator grasps one of the handles 65, 66 of the door end structure 60 in order to pull the door end structure 60 in a direction corresponding to the direction of extension of the rails 18, 20 away from the reel structure 41 of the spring-loaded roller assembly 40, which corresponds to moving the door assembly 10 towards the extended or closed configuration thereof. Tension is initially applied to each of the tension elements 91, 92 by the torsion spring assembly 50 as the door end structure 60 is slid away from the spring-loaded roller assembly 40, which causes the reel structure 41 to rotate about the rotational axis thereof against the urging of the torsion spring assembly 50. The rotation of the reel structure 41 results in an unrolling of the tension elements 91, 92 and the flexible screen 80. The movement of the door end structure 60 away from the spring-loaded roller assembly 40 causes the flexible screen 80 to unroll in a desired configuration wherein the flexible screen 80 follows the pathway of the door end structure 60, including the formation of at least one curved segment in the flexible screen 80, despite the lack of tension applied to the flexible screen 80. The door end structure 60 may be slid until the coupling mechanisms 22, 62 engage each other, thereby maintaining the flexible screen 80 in the closed configuration across the boundary between the interior and the exterior of the enclosure formed by the door assembly 10 to prevent the egress of water from the interior of the enclosure.

Upon a release of the removable coupling, the torsion spring assembly 50 urges the reel structure 41 to rotate in a manner for rolling the flexible screen 80 and the tension elements 91, 92 therearound. The tension is still maintained within the tension elements 91, 92 at all times, including during the retraction of the flexible screen 80, to prevent deformations from being introduced into the flexible screen 80 upon a return to the rolled configuration thereof. The flexible screen 80 and the tension elements 91, 92 continue to roll until the door end structure 60 is disposed immediately adjacent the spring-loaded roller assembly 40, which corresponds to the door assembly 10 being placed in the retracted or open configuration thereof.

The movement of the door assembly 10 towards the closed configuration thereof may include the first tension element 91 bearing against the top rail 18 and the second tension element 92 bearing against the bottom rail 20, wherein the tension elements 91, 92 slide along the rails 18, 20 while being unrolled from the spring-loaded roller assembly 40. The flexible screen 80 may be spaced apart from the rails 18, 20, or the flexible screen 80 may contact the rails 18, 20 along segments thereof, such as those segments having curvature introduced therein. The flexible screen 80 and each of the tension elements 91, 92 may include substantially the same profile shape as the surfaces of each of the rails 18, 20 facing towards the screen 80 and the elements 91, 92, wherein such a profile shape refers to a shape of each of the structures when viewed from a perspective parallel to the axis of rotation of the reel structure 41, such as from above the door assembly 10. The different structures having a substantially identical profile shape may include the presence of slight variations in length or the radius of curvature of any segment of any of the structures due to the possibility of slight offsets being present between the position of the different structures when unrolled from the reel structure 41. For example, each of the tension elements 91, 92 may conform substantially identically to the profile shape of each of the rails 18, 20 while at least one segment of the flexible screen 80 may include a different length or radius of curvature in comparison to the rails 18, 20 to account for a minor outward offset of the flexible screen 80 from the rails 18, 20.

The tension elements 91, 92 are described herein as carrying all of tension of the door assembly 10, but it should be apparent that certain circumstances may arise wherein at least a portion of the tension of the door assembly 10 is carried by the flexible screen 80. For example, as mentioned above, a slight degree of tension may be introduced into the flexible screen 80 where the flexible screen 80 contacts the rails 18, 20 where curvature is introduced therein. Any such tension carried by the flexible screen 80 must be selected to be low enough to prevent an occurrence of inward buckling therein when traversing the curved segments of the path followed by the flexible screen 80. As a general guideline, the tension elements 91, 92 are configured to collectively carry a greater tensile load than the flexible screen 80 at all positions of the door assembly 10. In other words, the flexible screen 80 will never carry a majority of the tension experienced collectively by the tension elements 91, 92 and the flexible screen 80. In certain embodiments, the tension elements 90 may collectively carry at least 50% of the tensile load applied by the torsion spring assembly 50. In other embodiment, the tension elements 90 may collectively carry at least 75% of the tensile load applied by the torsion spring assembly 50. In still other embodiments, the tension elements 90 may collectively carry at least 90% of the tensile load applied by the torsion spring assembly 50.

The invention has thus far been described as utilizing a pair of the tension elements 90, but the invention may utilize any number of the tension elements 90 so long as the relationships specified herein are maintained regarding the distribution of tensile forces among the tension elements 90 and the flexible screen 90. Specifically, in some embodiments, a single one of the tension elements 90 may be utilized and this single tension element 90 may carry a greater proportion of the tensile load than does the flexible screen 80. In other embodiments, greater than two of the tension elements 90 may be utilized, and the multiple tension elements 90 may be configured to collectively carry a greater percentage of the tensile load than does the flexible screen 80 in the manner described. In such circumstances, each of the multiple tension elements 90 may also individually carry a greater percentage of the tensile load than does the flexible screen 80, as desired.

Figure 12:
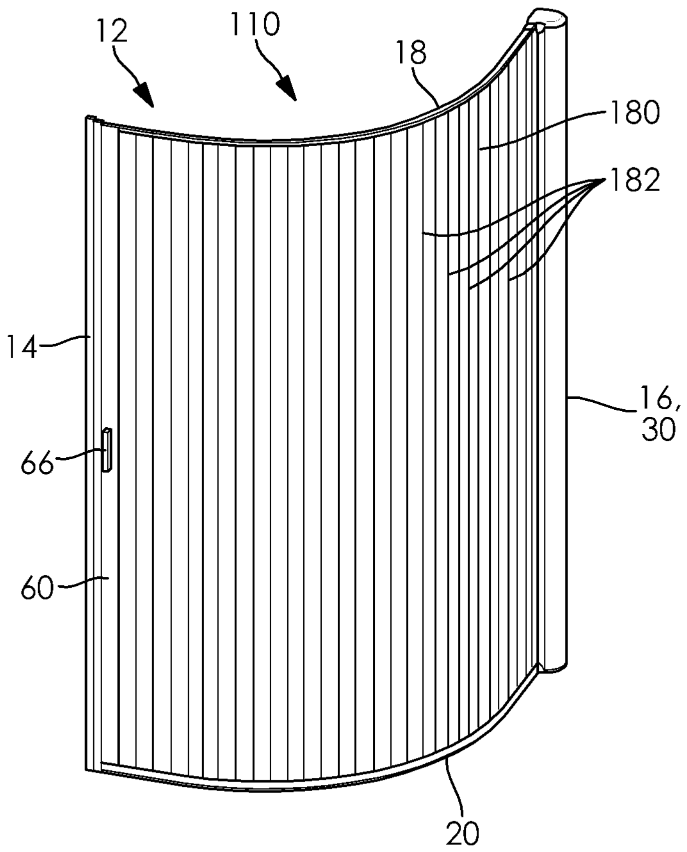
FIG. 12 is a front perspective view of a retractable curved door assembly according to another embodiment of the present invention.

Referring now to FIG. 12, a door assembly 110 according to another embodiment of the present invention is disclosed. The door assembly 110 is similar to the door assembly 10 in many respects and includes a frame 12 having the same structure of the rails 18, 20 and vertically extending members 14, 16 thereof. The door assembly 110 differs from the door assembly 10 due to the removal of the tension elements 91, 92 and a modification of the flexible screen 80. Specifically, the flexible screen 80 is replaced with a flexible screen 180 extending between the reel structure 41 of the spring-loaded roller assembly 40 and the door end structure 60. The removal of the tension elements 91, 92 also corresponds to a modification of the reel structure 41 to remove the tension element receiving portions 42, 44 thereof.

The flexible screen 180 may be formed from the same materials described as being suitable for forming the flexible screen 80. The flexible screen 180 is also substantially sheet-like in structure while having the same rectangular shape as the flexible screen 80. The flexible screen 180 differs from the flexible screen 80 due to the introduction of a plurality of vertically extending reinforcing structures 182 therein. As shown in FIG. 12, the reinforcing structures 182 may be spaced apart from one another with respect to the length direction of the flexible screen 180, which corresponds to a rolling/unrolling direction of the flexible screen 180. Each of the reinforcing structures 182 forms a portion of the flexible screen 180 having a greater bending stiffness than the non-reinforced segments of the flexible screen 180 disposed intermediate adjacent ones of the reinforcing structures 182 with respect to a bending of the flexible screen 180 about a horizontally extending axis. In other words, the reinforcing structures 182 are configured to prevent an incidence of inward buckling of the flexible screen 180 by stiffening and strengthening the flexible screen 180 with respect to a desired bending plane.

Figure 13A:
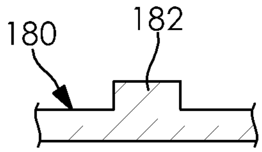
FIGS. 13A-13E are cross-sectional views showing various different reinforcing structures of the retractable curved door assembly of FIG. 12.
Figure 13B:
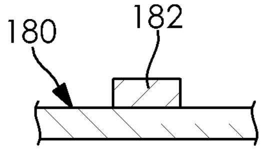
Figure 13C:
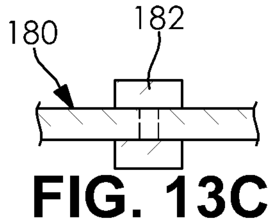
Figure 13D:
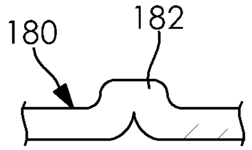
Figure 13E:
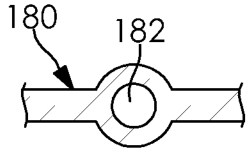

As shown in FIGS. 13A-13E, the introduction of the increased bending stiffness into the reinforcing structures 182 may be accomplished by any number of different means. FIG. 13A shows the reinforcing structures 182 as portions of the flexible screen 180 having an increased thickness with respect to a horizontal direction perpendicular to the vertical direction and the length direction of the flexible screen 180. This increased thickness increases an area moment of inertia of the flexible screen 180 relative to the corresponding bending plane, thereby stiffening the flexible screen 180 with respect to the desired bending plane. FIG. 13B illustrates the reinforcing structure 182 as a separate, vertically extending component coupled to an outer surface of the flexible screen 180. The reinforcing structure 182 of FIG. 13B may also be formed from a material having a greater bending stiffness than the remainder of the non-reinforced segments of the flexible screen 180 in addition to having an increased area moment of inertia relative to the desired bending plane. FIG. 13C is similar to FIG. 13B, except the reinforcing structure 182 is formed by a pair of separate components coupled to the flexible screen 180 with the flexible screen 180 sandwiched between the cooperating components. FIG. 13D includes the introduction of a fold into the flexible screen 180 to form the reinforcing structure 182, which once again increases the area moment of inertia of the flexible screen 180 with respect to the desired bending plane by thickening the flexible screen 180. Lastly, FIG. 13E shows the flexible screen 180 as having a vertically extending opening having a rod disposed therein for forming the reinforcing structure 182. The inclusion of the rod once again increases the area moment of inertia, and may be further selected to include a greater bending stiffness than the non-reinforced segments of the flexible screen 180. One skilled in the art should appreciate that alternative configurations or combinations of the illustrated configurations may be utilized while remaining within the scope of the present invention.

The door assembly 110 accordingly allows for the introduction of a curved segment into the flexible screen 180 without risking the inward buckling thereof due to the presence of the reinforcing structures 182 preventing such deformation. The flexible screen 180 is also able to bear against the rails 18, 20 while taking on its shape without the added tension causing the inward buckling of the flexible screen 180.

In use, the door end structure 60 is grasped and pulled away from the spring-loaded roller assembly 40 to unroll the reinforced flexible screen 180. The door end structure 60 slides along the rails 18, 20 via the sliding structure 67 thereof to cause the flexible screen 180 to take on the shape of the rails 18, 20. The flexible screen 180 may bear against the rails 18, 20 as the flexible screen 180 is extended around the curved segment of each of the rails 18, 20. The presence of the reinforcing structures 182 within the flexible screen 180 prevents any tension formed within the flexible screen 180 from leading to an inward deformation thereof, as the reinforcing structures 182 resist the bending of the flexible screen 180 about a horizontally extending axis via the increased bending stiffness of the flexible screen 180 along the desired bending plane. The door assembly 110 otherwise operates in the same manner as the door assembly 10, hence further description is omitted.

Figure 14:
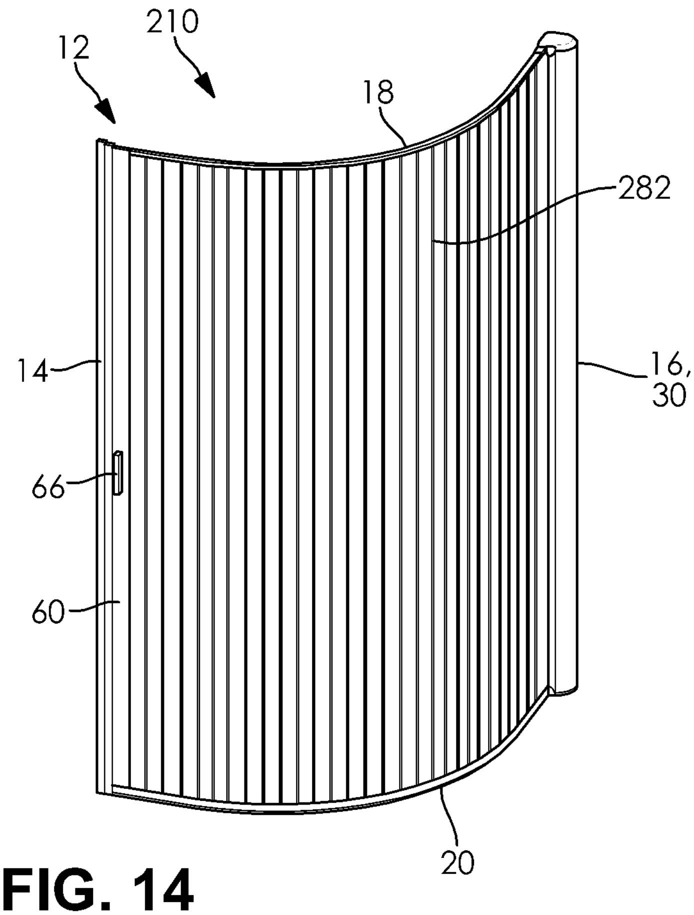
FIG. 14 is a front perspective view of a retractable curved door assembly according to yet another embodiment of the present invention.

Referring now to FIG. 14, a door assembly 210 according to another embodiment of the present invention is disclosed. The door assembly 210 is substantially identical to the door assembly 110 except the flexible screen 180 is replaced with a flexible screen 280.

Figure 15:
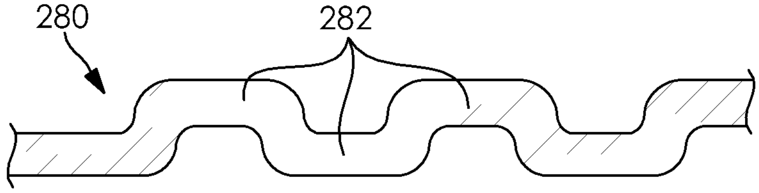
FIG. 15 is a cross-sectional view of a corrugated flexible screen.
Figure 16:
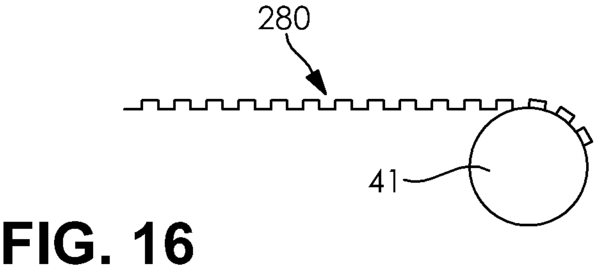
FIG. 16 is a top plan view showing the corrugated flexible screen unrolling from a spring-loaded roller assembly.

The flexible screen 280 operates in the same manner as the flexible screen 180. Specifically, the flexible screen 280 includes vertically extending corrugations 282 formed therein, wherein each of the corrugations 282 forms a reinforcing structure in similar fashion to the reinforcing structures 182 of the flexible screen 180. As is apparent from a review of FIG. 15, the corrugations 282 are configured to increase the area moment of inertia of the flexible screen 280 about the desired bending plane. As shown in FIG. 16, the corrugated shape of the flexible screen 280 is also able to be rolled onto or off of the reel structure 41 of the spring-loaded roller assembly 40.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A retractable curved door assembly comprising:

a spring-loaded roller assembly having a reel structure configured to rotate about an axis of rotation thereof;

a first rail extending away from the roller assembly in a direction perpendicular to the axis of rotation of the reel structure, a curved portion of the first rail curving about an axis arranged parallel to the axis of rotation of the reel structure as the first rail extends longitudinally in a direction away from the roller assembly;

a door end structure slidably or rollably engaging the first rail;

a flexible screen coupled to the reel structure and to the door end structure, the flexible screen rollable about the reel structure; and a first tension element provided independently of the flexible screen as an elongate cord or cable windable about the reel structure, the first tension element coupled to each of the reel structure and the door end structure independently of the flexible screen, wherein the first tension element bears against the curved portion of the first rail when the door end structure is slid or rolled therealong in the direction away from the roller assembly to cause the first tension element to take on a curvature of the curved portion of the first rail therealong, wherein a greater tensile force is applied to the first tension element than the flexible screen when the door end structure is slid or rolled along the curved portion of the first rail in the direction away from the reel structure to cause the flexible screen to also take on the curvature of the curved portion of the first rail in the absence of inward buckling of the flexible screen therealong.

2. The retractable curved door assembly of claim 1, wherein the flexible screen is formed of polyethylene terephthalate (PET).

3. The retractable curved door assembly of claim 1, wherein the flexible screen is self-supporting when the door end structure is slid or rolled along the curved portion of the first rail in the direction away from the reel structure.

4. The retractable curved door assembly of claim 1, wherein the flexible screen does not engage the first rail when the door end structure is slid or rolled along the curved portion of the first rail in the direction away from the reel structure.

5. The retractable curved door assembly of claim 1, wherein the flexible screen does not have an aperture to receive a protrusion extending from the first rail.

6. The retractable curved door assembly of claim 1, wherein the flexible screen is not retained in a position by friction between the flexible screen and the first rail.

7. The retractable curved door assembly of claim 1, wherein a portion of the flexible screen unwound from the reel structure is configured to include a shape matching a shape of the first rail when the door end structure is slid or rolled along the first rail in the direction away from the reel structure.

8. The retractable curved door assembly of claim 1, wherein a greater tensile force being applied to the first tension element than the flexible screen prevents the inward buckling of the flexible screen along the curved portion of the first rail due to the tension applied to a segment of the flexible screen extending along the curved portion of the first rail in the longitudinal direction of the flexible screen being insufficient to deviate the segment of the flexible screen from taking on the curvature of the curved portion of the first rail.

9. The retractable curved door assembly of claim 1, wherein the door end structure includes at least one handle.

10. The retractable curved door assembly of claim 1, wherein the door end structure includes a first coupling mechanism.

11. The retractable curved door assembly of claim 10, wherein the first rail forms a portion of a frame having a vertically extending member, wherein the vertically extending member includes a second coupling mechanism configured to be releasably coupled to the first coupling mechanism.

12. The retractable curved door assembly of claim 11, wherein the first coupling mechanism is a first magnetic element and the second coupling mechanism is a second magnetic element.

13. The retractable curved door assembly of claim 12, wherein the first coupling mechanism is configured to have a releasable snap-fit connection with the second coupling mechanism.

14. The retractable curved door assembly of claim 1, further comprising a second rail extending away from the spring-loaded roller assembly in the direction perpendicular to the axis of rotation of the reel structure, the second rail having the same shape as the first rail.

15. The retractable curved door assembly of claim 14, wherein the flexible screen extends vertically between the first rail and the second rail.

16. The retractable curved door assembly of claim 14, wherein the door end structure is slidably or rollably engaging the second rail.

17. The retractable curved door assembly of claim 14, further comprising a second tension element provided independently of the flexible screen as an elongate cord or cable windable about the reel structure, the second tension element coupled to each of the reel structure and the door end structure independently of the flexible screen, wherein a greater tensile force is applied to the second tension element than the flexible screen when the door end structure is slid or rolled along the curved portion of the first rail in the direction away from the reel structure.

18. The retractable curved door assembly of claim 14, wherein the first tension element is configured to engage the first rail and the second tension element is configured to engage the second rail when the door end structure is slid or rolled along the first rail in the direction away from the reel structure.

19. A retractable curved door assembly comprising:

a spring-loaded roller assembly having a reel structure configured to rotate about an axis of rotation thereof;

a first rail and a second rail each extending away from the reel structure in a direction perpendicular to the axis of rotation of the reel structure, a curved portion of each of the first rail and the second rail curving about an axis arranged parallel to the axis of rotation of the reel structure as each of the first rail and the second rail extend longitudinally in a direction away from the roller assembly;

a door end structure slidably or rollably engaging each of the first rail and the second rail;

a flexible screen coupled to the reel structure and to the door end structure, the flexible screen rollable about the reel structure, the flexible screen extending vertically between the first rail and the second rail;

a first tension element provided independently of the flexible screen as an elongate cord or cable windable about the reel structure, the first tension element coupled to each of the reel structure and the door end structure independently of the flexible screen, wherein the first tension element bears against the curved portion of the first rail when the door end structure is slid or rolled therealong in the direction away from the roller assembly to cause the first tension element to take on a curvature of the curved portion of the first rail therealong; and a second tension element provided independently of the flexible screen as an elongate cord or cable windable about the reel structure, the second tension element coupled to each of the reel structure and the door end structure independently of the flexible screen, wherein the second tension element bears against the curved portion of the second rail when the door end structure is slid or rolled therealong in the direction away from the roller assembly to cause the second tension element to take on a curvature of the curved portion of the second rail therealong, wherein a greater tensile force is applied collectively to the first tension element and the second tension element than is applied to the flexible screen when the door end structure is slid or rolled along the first rail and the second rail in the direction away from the reel structure to cause the flexible screen to also take on the curvature of the curved portion of each of the first rail and the second rail in the absence of inward buckling of the flexible screen therealong.

* * * * *